Aug. 25, 1942.   C. R. BETHARD   2,294,271
TIRE REMOVING TOOL
Filed Sept. 22, 1941
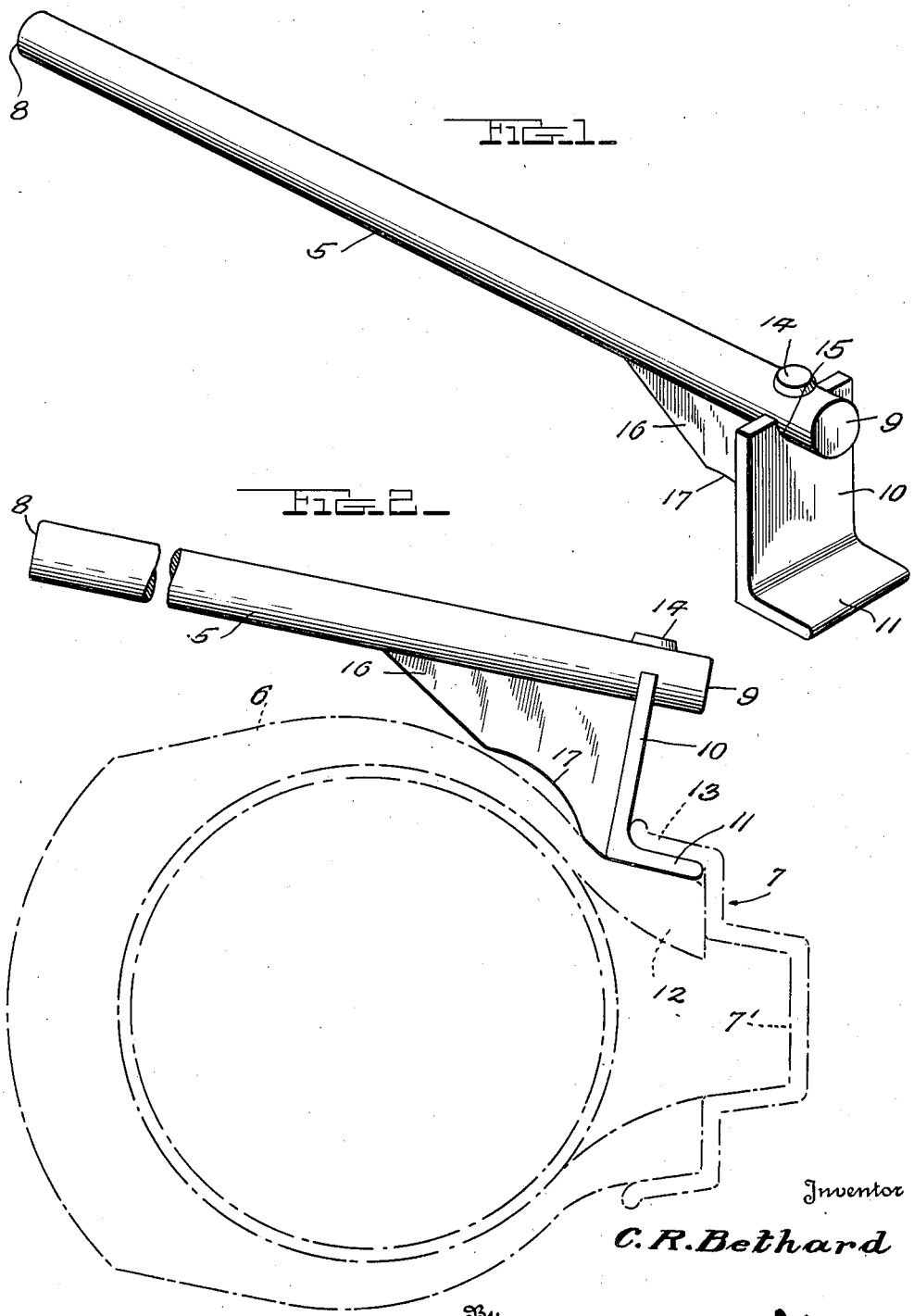
Inventor
C. R. Bethard
By H. B. Wilson & Co.
Attorneys Patented Aug. 25, 1942

2,294,271

UNITED STATES PATENT OFFICE 2,294,271

TIRE REMOVING TOOL

Clarence R. Bethard, Taylorville, Ill.

Application September 22, 1941, Serial No. 411,913

2 Claims. (Cl. 157—6)

The invention aims to provide a simple and inexpensive, yet a convenient and efficient tool for use in removing pneumatic tires from drop-center rims, the tool being of particular value in connection with tractor tires and other large size tires which often become so rusted upon the rims that it is almost an impossibility to loosen the beads and force them toward the well or drop-center of the rim. With the present tool, however, this may be accomplished with ease and in a very short time.

With the above object in view, the invention resides in the subject matter hereinafter described and claimed, description being accomplished by reference to the accompanying drawing.

Figure 1 is a perspective view of the tool.

Figure 2 is a side elevation, partly broken away showing the manner of using the tool, the tire, tube and rim being illustrated in dot and dash lines.

A preferred construction has been shown in the drawing and will be specifically described, with the understanding, however, that within the scope of the invention as claimed, minor variations may be made.

A straight rigid handle bar 5 is provided to extend radially at one side of a tire 6 to be removed from a rim 7. This bar 5 is provided with one end surface 8 to receiver hammer blows when driving the tool into operative position, and is provided with another end surface 9 to receive the hammer blows when removing the tool, should it be frictionally held.

Near the end 9 of the handle bar 5 is a rigid arm 10 which is welded or otherwise rigidly secured to said handle bar, said arm being adapted to extend to the tire side wall adjacent the bead thereof. Rigidly joined to the outer end of this arm 10 is a rigid finger 11 extending in a direction substantially parallel with the bar 5, for insertion between the tire bead 12 and the rim flange 13. Thus, hammer blows delivered at the point 14 on the handle bar 5, opposite the arm 10, will be transmitted by this arm and the finger 11 directly to the bead 12, to loosen the latter and drive it toward the well or drop center 7' of the rim. Of course, in order to insert the finger 11 between the bead and rim flange, it is necessary to drive it into place by delivering hammer blows on the end surface 8 of the handle bar 5, and this initially loosens the bead by a wedging action, more loosening being then accomplished by hammering at the point 14. Then, by hammering on the end surface 9, the tool may be removed with ease, and moved circumferentially of the tire to another position, the operation being repeated as many times as necessary to loosen the tire beads and drive them toward the drop-center, permitting them to enter this drop-center or well and thereby allowing removal of the tire.

In the preferred form of construction, the arm 10 and finger 11 are formed from a single short piece of angle metal, the arm being formed with a semi-circular notch 15 in which the handle bar 5 is welded. When this construction is employed, or any other construction which would require bracing of the arm 10, I provide an appropriate brace extending from the arm to the handle bar. This brace, in the present disclosure, consists of a substantially triangular web 16 fitting into the angle between the handle bar and arm and welded to both thereof. The outer edge of this web is formed with an inwardly curved portion 17 to clear the side wall of the tire so that the web will not interfere with delivery of blows direct to the tire bead from the point 14.

In order that the hammer blows may be more effectively delivered at the point 14, the handle bar 5 may here be provided with a raised anvil portion, as shown.

From the foregoing and the accompanying drawing, it will be seen that novel and advantageous provision has been made for carrying out the objects of the invention, and while a preferred construction has been illustrated, attention is again invited to the possibility of making variations within the scope of the invention as claimed.

I claim:

1. A tool for loosening pneumatic tires from drop-center rims, comprising a straight one-piece rigid handle bar to extend radially at one side of and in outwardly spaced relation with the tire, said handle bar having one end to receive hammer blows to drive the tool endwise to operative position, and another end to receive hammer blows to drive the tool endwise in the other direction to released position, said bar being provided with an integral laterally projecting rigid arm near said other end to extend to the tire side wall and space said handle bar from said wall and the adjacent rim flange, the outer end of said arm being provided with an integral rigid flat finger disposed in a plane substantially parallel with the length of said bar, said finger projecting away from said one end of said bar for insertion between the bead of said tire side wall and the contacting rim flange when the tool is driven to operative position, the side of said handle bar opposite said arm being provided with an integral anvil portion in alinement with said arm to receive hammer blows, whereby these blows will drive the entire tool toward the rim center and cause said finger to force the tire bead away from the rim flange.

2. A structure as specified in claim 1; together with a rigid longitudinal brace web at the side of said arm opposite said finger, said brace web being integrally joined to said arm and to said handle bar and having an inwardly curved outer edge to clear the tire side wall.

CLARENCE R. BETHARD.